US010185935B2

(12) United States Patent
Rodoni

(10) Patent No.: US 10,185,935 B2
(45) Date of Patent: Jan. 22, 2019

(54) SMART WASTE RECEPTACLE PROVIDING USE-INCENTIVE

(71) Applicant: Rubicon Global Holdings, LLC, Atlanta, GA (US)

(72) Inventor: Philip Rodoni, Decatur, GA (US)

(73) Assignee: RUBICON GLOBAL HOLDINGS, LLC, Atlanta, GA (US)

(*) Notice: Subject to any disclaimer, the term of this patent is extended or adjusted under 35 U.S.C. 154(b) by 117 days.

(21) Appl. No.: 15/231,095

(22) Filed: Aug. 8, 2016

(65) Prior Publication Data

US 2018/0039959 A1 Feb. 8, 2018

(51) Int. Cl.

| G06Q 40/00 | (2012.01) |
| G06Q 10/00 | (2012.01) |
| B65F 1/14 | (2006.01) |
| B65F 1/16 | (2006.01) |
| G06Q 20/10 | (2012.01) |
| B65F 1/00 | (2006.01) |
| H02J 7/35 | (2006.01) |
| H02J 7/00 | (2006.01) |

(52) U.S. Cl.
CPC .............. *G06Q 10/30* (2013.01); *B65F 1/006* (2013.01); *B65F 1/1473* (2013.01); *B65F 1/1607* (2013.01); *B65F 1/1615* (2013.01); *B65F 1/1646* (2013.01); *G06Q 20/10* (2013.01); *B65F 2210/138* (2013.01); *B65F 2210/168* (2013.01); *B65F 2210/172* (2013.01); *H02J 7/0027* (2013.01); *H02J 7/35* (2013.01)

(58) Field of Classification Search
CPC . G06Q 30/0241; G06Q 30/0207; B30B 15/26
See application file for complete search history.

(56) References Cited

U.S. PATENT DOCUMENTS

| 5,360,132 A * | 11/1994 | Edelhoff | B65F 1/1607 220/213 |
| 5,375,860 A * | 12/1994 | Ernsberger | B62B 3/00 220/909 |
| 5,953,504 A * | 9/1999 | Sokal | G06Q 20/18 379/100.04 |
| 7,007,598 B1 * | 3/2006 | Patras | B30B 9/3007 100/215 |

(Continued)

OTHER PUBLICATIONS

Khumo, Sebambo ("Dutch student designs a mobile system to encourage recycling in Nepal" Oct. 2015, http://www.designindaba.com/articles/creative-work/dutch-student-designs-mobile-system-encourage-recycling-nepal). (Year: 2015).*

(Continued)

*Primary Examiner* — Bruce I Ebersman
*Assistant Examiner* — Mark H Gaw
(74) *Attorney, Agent, or Firm* — Rock IP, PLLC

(57) ABSTRACT

A receptacle is disclosed for containing waste. The waste receptacle may have a container with at least one opening, and a sensor configured to generate a signal indicative of rubbish being deposited through the at least one opening. The waste receptacle may also have a public-use device operatively connected to the container, and a controller in communication with the sensor and the public-use device. The controller may be configured to selectively provide access to the public-use device based on the signal.

20 Claims, 2 Drawing Sheets

(56) References Cited

U.S. PATENT DOCUMENTS

| | | | |
|---|---|---|---|
| 2002/0108507 A1* | 8/2002 | May | B30B 9/3007 100/45 |
| 2005/0097608 A1* | 5/2005 | Penke | G06F 21/35 725/60 |
| 2015/0144012 A1* | 5/2015 | Frybarger | G06Q 30/0241 100/102 |

OTHER PUBLICATIONS

Harrington, Rebecca ("New York's Garbage Cans Will Turn Into Wi-Fi Hotspots" Jul. 14, 2015 https://web.archive.org/web/20150715192034/https://www.popsci.com/garbage-cans-are-new-wi-fi-hotspot). (Year: 2015).*

* cited by examiner

SMART WASTE RECEPTACLE PROVIDING USE-INCENTIVE

TECHNICAL FIELD

The present disclosure relates generally to a waste receptacle and, more particularly, to a smart waste receptacle for providing incentive to deposit waste into the receptacle.

BACKGROUND

Municipalities, governmental agencies, institutions, and private businesses set out conventional waste receptacles in common areas to help maintain a clean environment in those areas. In particular, the waste receptacles are situated at convenient and/or problem locations to encourage individuals to deposit litter within the receptacles rather than on the ground. Unfortunately, the convenience of a public waste receptacle may not be enough incentive to keep the public from littering the ground in some situations.

The disclosed waste receptacle is directed to overcoming one or more of the problems set forth above and/or other problems of the prior art.

SUMMARY

In one aspect, the present disclosure is directed to a waste receptacle. The waste receptacle may include a container having at least one opening, and a sensor configured to generate a signal indicative of rubbish being deposited through the at least one opening. The waste receptacle may also include a public-use device operatively connected to the container, and a controller in communication with the sensor and the public-use device. The controller may be configured to selectively provide access to the public-use device based on the signal.

In another aspect, the present disclosure is directed to another waste receptacle. This waste receptacle may include a container, and a public-use device operatively connected to the container. The public-use device may include at least one of a charging station, an Internet hotspot, a console, and a telephone. The waste receptacle may also include a solar charger connected to the container and configured to power the public-use device.

In yet another aspect, the present disclosure is directed to a method of incentivizing disposal of waste inside of a container. The method may include sensing that rubbish has been deposited through at least one opening of the container. The method may also include selectively providing access to a public-use device based on the sensing.

DETAILED DESCRIPTION

Figure 1:
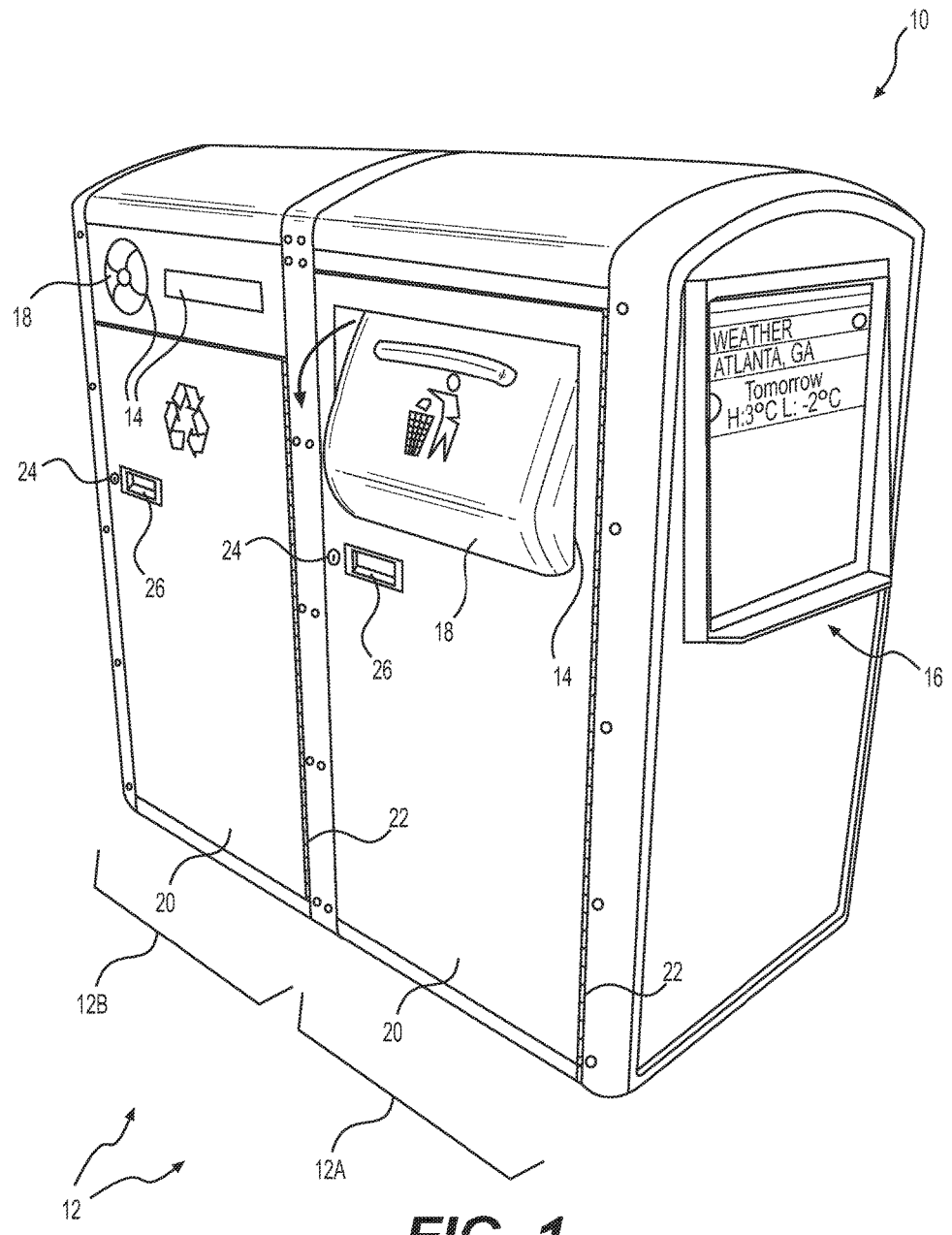
FIG. 1 is perspective view illustration of an exemplary disclosed waste receptacle.

FIG. 1 illustrates an exemplary waste receptacle 10. Waste receptacle 10 may be an assembly of components that, together, provide an incentive for users to place rubbish (e.g., general waste and/or recyclables) into waste receptacle 10. These components may include, among other things, at least one container 12 having at least one opening 14, and one or more public-use devices 16 operatively connected to (e.g., mounted on, recessed within, etc.) container 12.

In the disclosed embodiment of FIG. 1, waste receptacle 10 includes two containers 12 located side-by-side. Containers 12 may have any shape and size, and be connected to each other in any manner known in the art (e.g., via welding or mechanical fastening). When waste receptacle 10 includes more than one container 12, each container may be used for a specific purpose. For example, a first container 12a may be used for general waste, while a second container 12b may be used for recyclables. It is contemplated that multiple different recyclable containers 12b could be included, arranged in any configuration, and/or used for different types of recyclable materials.

Any number of openings 14 may be provided within each container 12, and openings 14 may be the same or different. For example, waste container 12a may include a larger opening 14 than a corresponding opening 14 formed within recyclable container 12b. In addition, in some embodiments, the particular opening 14 provided within recyclable container 12b could be shaped to receive particular materials. For example, when intended to receive bottles, opening 14 may be circular. And when intended to receive paper, opening 14 may be rectangular and narrow (e.g., resembling a slot). In some instances, openings 14 may be formed in sides of containers 12 and, in other instances, formed in tops of containers 12. Other shapes and configurations may also be possible.

One or all of openings 14 may be provided with a cover 18. For example, opening 14 of container 12a may be provided with a pivoting type cover 18 (shown on the right in FIG. 1) that, when pulled by a user, pivots outward toward the user to reveal opening 14. In another example, opening 14 of container 12a may be provided with a flap-type cover 18 (shown on the left in FIG. 1) that can be pushed aside during insertion of a bottle or other recyclable material. Covers 18 may inhibit the ingress of pests and/or precipitation, while also helping to contain fumes and waste inside of containers 12.

Maintenance of containers 12 (e.g., emptying of rubbish) may be performed in many different ways. In the embodiment of FIG. 1, maintenance may be performed via one or more doors 20 that are pivotally connected (e.g., via hinges 22) to the sides of containers 12. In other embodiments, however, maintenance may be performed by removing the tops of containers 12. In some examples, a lock 24 and/or a handle 26 may be provided for use in opening doors 20 and/or removing the tops. Other conventional features typically included on waste receptacles (e.g., casters, feet, anchors, etc.) may also be provided on containers 12 of FIG. 1, if desired.

Figure 2:
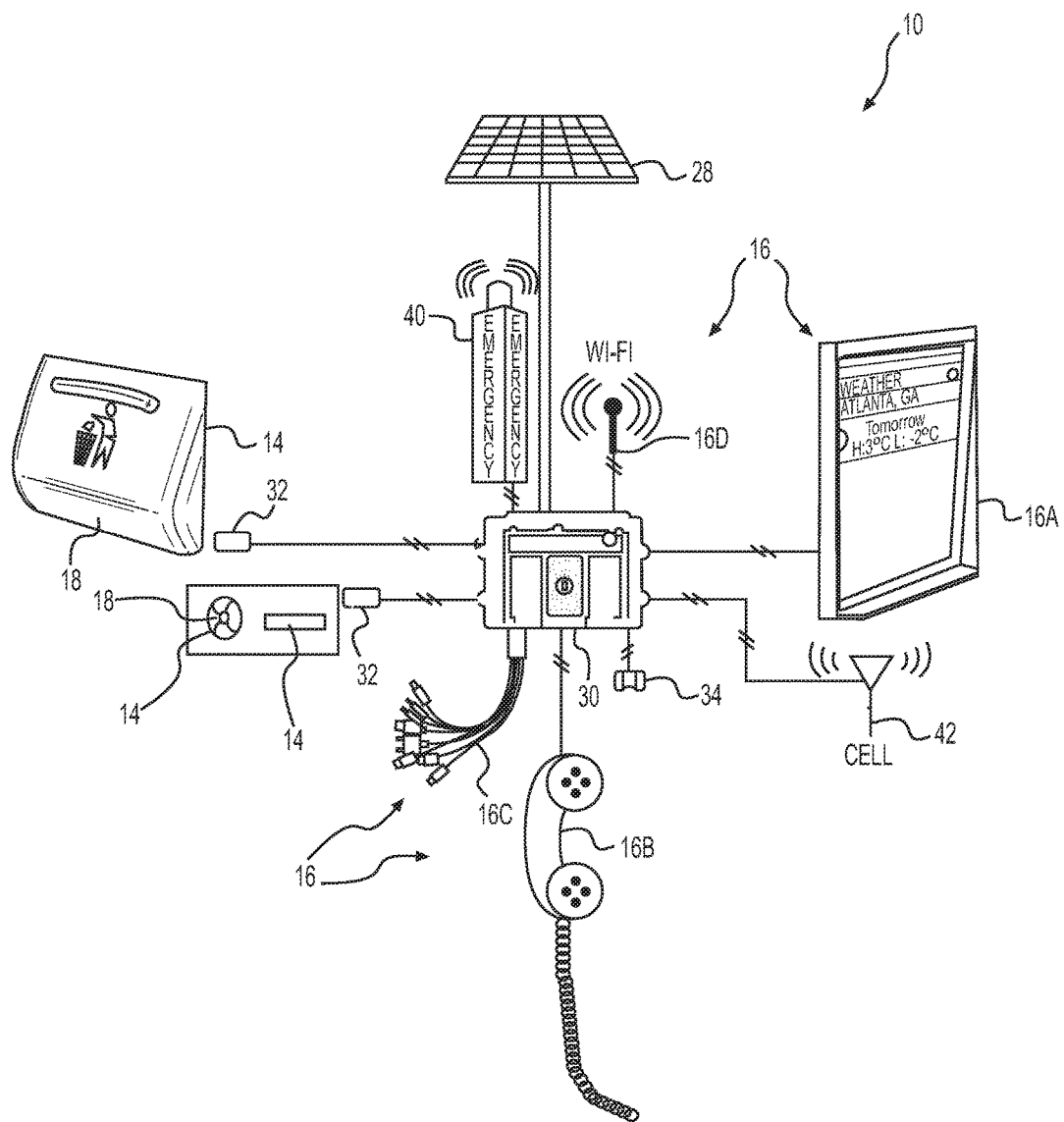
FIG. 2 is a diagrammatic illustration of the waste receptacle of FIG. 1.

As can be seen in the diagrammatic illustration of FIG. 2, waste receptacle 10 may include any number and type of public-use devices 16 physically connected to one or more containers 12 (omitted from FIG. 2 for clarity). Each public-use device 16 may be electrically powered and intended to attract the attention of the general public. For example, public-use devices 16 may include a console 16a useable to access the Internet or to play a video game, a telephone 16b, a charging station 16c useable to charge personal electronics, and/or an Internet hotspot 16d. These devices may be powered, for example, by way of a solar charger 28, a conventional utility grid, a battery, or another source, and their use regulated by a controller 30 in response to input from one or more sensors 32.

Controller 30 may include an arrangement of electronic circuitry configured to perform arithmetic, logic, input/ output, and control operations during sequential execution of pre-programmed instructions. It should be noted that, although controller 30 is shown and described as a single "unit", it is contemplated that the functions of controller 30 could alternatively be completed by any number of co-located or remotely distributed and cooperating processing units, as desired. Numerous commercially available microprocessors may be configured to perform the functions of controller 30. Further, the microprocessors may be general-purpose processors or specially constructed for use in implementing the disclosed concepts.

Sensors 32 may be associated with openings 14, covers 18, and/or doors 20 and configured to generate signals indicative of waste receptacle 10 being used. In particular, sensors 32 may embody motion detectors, pivot angle sensors, proximity sensors, cameras, pressure sensors, weight sensors, or other types of devices that are configured to detect when covers 18 have been moved, when rubbish has passed through the corresponding openings 14, when doors 20 have been opened, and/or when a weight of waste receptacle 10 has increased. The signals generated by these sensors 32 may represent a frequency, amount, and/or type of rubbish being deposited and/or removed from containers 12. Sensors 32 may communicate these signals to controller 30 for further processing.

Controller 30 may be configured to selectively provide access to one or more public-use devices 16 in response to the signals generated by one or more sensors 32. For example, each time that controller 30 makes a determination that rubbish has been deposited inside of container 12, controller 30 may activate (e.g., provide electrical power to, unlock, etc.) one or more of public-use devices 16. In some embodiments, the access may be limited and/or have multiple tiers. For example, for a single piece and/or amount of rubbish deposited within containers 12, controller 30 may provide access to a particular public-use device 16 and/or for a particular period of time. Similarly, when a greater amount of rubbish is deposited, different public-use devices 16 may be accessed, a greater amount of access time may be allowed, and/or greater functionality of public-use devices 16 may be authorized. In one embodiment, controller 30 may provide greater access when recyclable material is deposited within container 12b instead of within container 12a. This access may provide an incentive for the public to dispose of rubbish, and even greater incentive for the public to recycle.

It is contemplated that some or all functionality of public-use devices 16 may also be accessible based on a payment being received, regardless of any signals being generated by sensors 32. In particular, in some embodiments, waste receptacle 10 could be equipped with a payment receiving device 34 that is in communication with controller 30. In these embodiments, access to public-use devices may be purchased via payment receiving device 34 rather than as an award to incentivize waste disposal.

Controller 30 may selectively activate any one or more of public-use devices 16 at a time when no one is actively using waste receptacle 10. For example, controller 30 may be configured to selectively cause information to be displayed on console 16a between uses by the public. This information could include advertising, the weather, public announcements, public alerts (e.g., Amber Alerts, severe weather alerts, and so on), etc. It is also contemplated that a dedicated device (e.g., an emergency alert) 40 could be mounted to container(s) 12 and selectively activated by controller 30 for use in alerting the public, if desired.

In addition to using the signals from sensors 32 as a way to know when to reward a user for properly using waste receptacle 10, controller 30 may be configured to use these signals for additional purposes. In particular, the signals may be used to track a fill status of containers 12. For example, based on the frequency, type, and/or amount signals generated by sensors 32, controller 30 may be able to determine when containers 12 are full or nearly full and in need of servicing. When this determination is made, controller 30 may transmit a message to an associated service provider (e.g., via a wired or wireless communication network 42) alerting them of the fill status.

INDUSTRIAL APPLICABILITY

The disclosed waste receptacle 10 may be used in any application where a cleaner environment is desired. For example, waste receptacle 10 may be placed in a park, within an inner-city pedestrian zone, on a college campus, or in a governmental building. Waste receptacle 10 may help to clean up these environments by providing incentives for the public to properly dispose of waste. In addition, the disclosed waste receptacle 10 may serve the public by relaying public service announcements and/or weather.

It will be apparent to those skilled in the art that various modifications and variations can be made to the disclosed waste receptacle. Other embodiments will be apparent to those skilled in the art from consideration of the specification and practice of the disclosed waste receptacle. For example, in addition or as an alternative to providing access to a public-use device in return for depositing rubbish into container 12, it may be possible to simply recognize the depositor for the effort. For example, an on-screen "Thank You!" may be shown, a text may be sent, etc. It is intended that the specification and examples be considered as exemplary only, with a true scope being indicated by the following claims and their equivalents.

What is claimed is:
1. A waste receptacle, comprising:
   a container including a waste opening and a recycling opening, the waste opening including a plurality of first sensors configured to generate a first signal indicative of recyclable material being deposited through the waste opening, the recycling opening including a plurality of second sensors configured to generate a second signal indicative of recyclable material being deposited through the recycling opening, the plurality of first sensors each including a motion detector, a pivot angle sensor, a pressure sensor, and a weight sensor and the plurality of second sensors each including a motion detector, a pivot angle sensor, a pressure sensor, and a weight sensor;
   a public-use device coupled to the container; and
   a controller in communication with the plurality of first sensors, the plurality of second sensors, and the public-use device, the controller being configured to selectively provide multi-tiered access to the public-use device based on the first signal and the second signal;
   wherein the multi-tiered access includes providing greater access or no access to the public-use device based on the plurality of first sensors determining when recyclable material is deposited through the waste opening and the plurality of second sensors determining when recyclable material is deposited through the recycling opening.

2. The waste receptacle of claim 1, wherein:
the controller is configured to provide the greater access to the public-use device based on the second signal than the first signal by providing a greater amount of access time or a greater amount of functionality.

3. The waste receptacle of claim 1, wherein the public-use device is at least one of a charging station, an Internet hotspot, a console, and a telephone.

4. The waste receptacle of claim 3, wherein:
the public-use device is a console having connectivity with the Internet; and
the controller is further configured to display information on the console regardless of the first signal.

5. The waste receptacle of claim 4, wherein the information includes at least one of advertising, weather, time, a public announcement, and a public alert.

6. The waste receptacle of claim 1, further including a solar charger operatively connected to the container and configured to power the public-use device.

7. The waste receptacle of claim 1, further including an emergency alert device operatively connected to the container, wherein the controller is further configured to activate the emergency alert device regardless of the signal.

8. The waste receptacle of claim 1, further including a payment receiving device, wherein the controller is further configured to selectively provide access to the public-use device based on payment received via the payment receiving device regardless of the signal.

9. The waste receptacle of claim 1, wherein the controller is further configured to selectively transmit a message indicative of a fill status of the container based on the signal.

10. A waste receptacle, comprising:
a container having a waste opening and a recycling opening, the waste opening including a plurality of first sensors and the recycling opening including a plurality of second sensors, each of the plurality of first sensors including a motion detector, a pivot angle sensor, a pressure sensor, and a weight sensor and each of the plurality of second sensors including a motion detector, a pivot angle sensor, a pressure sensor, and a weight sensor;
a public-use device coupled to the container;
a solar charger connected to the container and configured to power the public-use device;
the plurality of first sensors configured to generate a first signal indicative of recyclable material being deposited through the waste opening;
the plurality of second sensors configured to generate a second signal indicative of recyclable material being deposited through the recycling opening; and
a controller in communication with the plurality of first sensors, the plurality of second sensors, and the public-use device, the controller being configured to selectively provide multi-tiered access to the public-use device based on the first signal and the second signal, wherein the multi-tiered access includes providing greater access when recyclable material is deposited through the recycling opening and less access when recyclable material is deposited through the waste opening.

11. The waste receptacle of claim 10, wherein:
the public-use device is a console having connectivity with the Internet; and
when the console is not being actively operated by a user, the console is configured to display at least one of advertising, weather, time, a public announcement, and a public alert.

12. A method of incentivizing disposal of waste inside of a first container, comprising:
determining, by a controller coupled to a plurality of first sensors, when recyclable material is deposited through a waste opening of the first container using the plurality of first sensors;
determining, by the controller further coupled to a plurality of second sensors, when recyclable material is deposited through a recycling opening of the first container using the plurality of second sensors; and
providing greater access or no access to a public-use device coupled to the controller based on determining when recyclable material is deposited through the waste opening and when recyclable material is deposited through the recycling opening;
wherein the plurality of first sensors each include a motion detector, a pivot angle sensor, a pressure sensor, and a weight sensor and the plurality of second sensors each include a motion detector, a pivot angle sensor, a pressure sensor, and a weight sensor.

13. The method of claim 12, wherein:
the plurality of first sensors and plurality of second sensors further include one or more of a camera and a proximity sensor.

14. The method of claim 12, wherein the public-use device is at least one of a charging station, an Internet hotspot, a console, and a telephone.

15. The method of claim 12, wherein:
the public-use device is a console having connectivity with the Internet; and
the method further includes displaying information on the console regardless of the determination.

16. The method of claim 12, wherein the information includes at least one of advertising, weather, time, a public announcement, and a public alert.

17. The method of claim 12, further including solar charging the public-use device.

18. The method of claim 12, further including selectively activating an emergency alert device operatively connected to the container, regardless of the sensing.

19. The method of claim 12, further including:
receiving payment via a device on the public-use device; and
selectively providing access to the public-use device based on payment received via the device regardless of the sensing.

20. The method of claim 12, further including transmitting a message indicative of a fill status of the container based on the sensing.

* * * * *